United States Patent
Hembry

(10) Patent No.: US 7,103,872 B2
(45) Date of Patent: Sep. 5, 2006

(54) SYSTEM AND METHOD FOR COLLECTING AND TRANSFERRING SETS OF RELATED DATA FROM A MAINFRAME TO A WORKSTATION

(75) Inventor: Douglas M. Hembry, Los Gatos, CA (US)

(73) Assignee: International Business Machines Corporation, Armonk, NY (US)

( * ) Notice: Subject to any disclaimer, the term of this patent is extended or adjusted under 35 U.S.C. 154(b) by 749 days.

(21) Appl. No.: 10/243,465

(22) Filed: Sep. 14, 2002

(65) Prior Publication Data

US 2004/0054686 A1    Mar. 18, 2004

(51) Int. Cl.
  G06F 9/44    (2006.01)
  G06F 12/00   (2006.01)
  G06F 17/30   (2006.01)
(52) U.S. Cl. ............................ 717/104; 707/204; 707/3
(58) Field of Classification Search ................... 707/10, 707/101, 102, 204, 3
  See application file for complete search history.

(56) References Cited

U.S. PATENT DOCUMENTS

| | | | |
|---|---|---|---|
| 6,708,166 B1 * | 3/2004 | Dysart et al. ................... | 707/6 |
| 6,785,673 B1 * | 8/2004 | Fernandez et al. .............. | 707/3 |
| 6,957,234 B1 * | 10/2005 | Steinbach .................... | 707/201 |
| 6,961,900 B1 * | 11/2005 | Sprague et al. .............. | 715/513 |
| 7,031,956 B1 * | 4/2006 | Lee et al. ........................ | 707/3 |
| 2001/0044811 A1 | 11/2001 | Ballantyne et al. .......... | 707/513 |
| 2002/0023113 A1 | 2/2002 | Hsing et al. ................. | 707/513 |
| 2003/0028589 A1 * | 2/2003 | Hittleman et al. ........... | 709/203 |

FOREIGN PATENT DOCUMENTS

WO    WO 01/67294 A2    9/2001

* cited by examiner

Primary Examiner—Wei Zhen
Assistant Examiner—Philip Wang
(74) Attorney, Agent, or Firm—Samuel A. Kassatly

(57) ABSTRACT

A system, method, and computer program product for collecting sets of related data with minimal redundancy, at a mainframe, and for transferring the collected data to a local workstation for processing. The mainframe remotely executes a utility application to construct an object model describing a desired structure of database elements. The object model is encoded into a single descriptive stream, such as XML, and converted to a metadata class for subsequent transfer to the local workstation. At the local workstation, the metadata class is decoded into a reconstructed object model for further processing.

9 Claims, 4 Drawing Sheets

SYSTEM AND METHOD FOR COLLECTING AND TRANSFERRING SETS OF RELATED DATA FROM A MAINFRAME TO A WORKSTATION

FIELD OF INVENTION

The present invention generally relates to database management systems, and particularly to a system, method, and computer program product for collecting sets of related metadata with minimal redundancy, at a mainframe, and for transferring the collected data to a local workstation for processing. More specifically, the present invention relates to a utility application on the mainframe, which remotely executes the computing-intensive phases of the data collection process and selectively transmits the required elements to the local workstation with minimal redundancy.

BACKGROUND OF THE INVENTION

Large enterprise application solutions typically use database management systems (DBMS) such as DB2®, Informix®, Oracle®, MS SQL Server®, and others to store and retrieve data. These database management systems are found in every aspect of the society ranging from business sectors to government institutions. Because of the wide ranging applications, the schemas for these solutions are sometimes very complex, including tens of thousands of tables and indexes or more. Concomitantly, the number of objects in these database management systems generally pose significant challenges to typical database administration (DBA) operations such as backup, reorganization, statistics collection, and database space growth management.

Large databases are comprised of multiple sub-databases to form hierarchical database systems, allowing parallel processing and workload sharing for many of the database's functions among the sub-database systems. More importantly, the hierarchical database systems provide many other significant advantages, such as data protection and database outage prevention.

Typically, large databases reside on large mainframes that are also referred to as database servers. These database servers are interconnected in a communication network that serves as a data highway. Through this communication network, data information from the mainframes flows to a user who may be operating on a local workstation.

Workstations provide a user interface typically via monitors and input devices. To control the flow of information to the user, a central processing mainframe, or interface, is connected between the local workstation and the database server to provide program execution and data management. The central processing mainframe also acts as a host server. In an exemplary information management system (IMS) the hierarchical databases are stored on auxilliary storage (disk storage) attached directly to the mainframe system.

As an illustration, a user wishes to perform a transaction using an information management system (IMS) software. This software accepts the transaction input from the user across the communication network, and dispatches an application program that runs on a central processing mainframe. Generally, the application program requires access to a set of data stored in hierarchical databases.

IMS hierarchic databases warehouse large volumes of data, each one of which is stored in a hierarchical structure. A single record in a hierarchical database typically includes multiple related records, called segments, that are grouped together in a tree structure, similar to a directory structure. Individual records are usually indexed and secondary (alternate) indexes may also be present, providing direct access to some segments.

Generally, the central processing mainframe, also referred to as the IMS mainframe, controls various logical regions that manage application programs for use by the user. Upon a request from the end-user, the IMS control region schedules an application program in a dependent region. In order to schedule program execution, the control region requires two pieces of information: a program specification block (PSB) and a database description (DBD).

A program specification block (PSB) is a physical program module that is stored in a library, that resides on the IMS mainframe. The purpose of the PSB is to define the data view of an information management system (IMS) application program as a subset of the full set of IMS hierarchic databases residing on that mainframe.

A database description (DBD) defines the database tree structure of one IMS hierarchical database by encoding the information into a special library that resides on the IMS mainframe. A DBD for a particular can be accessed through this DBD library.

A DBD may be physical or logical. A physical DBD describes an actual physically existing hierarchic set of data on a storage facility. A logical DBD describes a virtual hierarchy of data emulated by the IMS software from one or more physical databases that are linked by cross database references (or pointers). An application's PSB may point to either physical or logical DBD's, and the application may process either, with generally similar semantics.

When the control region services the user request, the IMS application program interacts with the PSB that points to a logical DBD, which, in turn, points to numerous other physical DBD's according to its logical relationship defined by the pointers. In this manner, the IMS application program is sensitive to the multiple hierarchical databases.

Also, a physical DBD may have logical relationships with other physical DBD's. Thus, in order to process all the blocks of information provided by the PSB and the various logical and physical DBD's for a particular IMS application program, an extensive web of related blocks may need to be moved from the IMS mainframe (or database server) to the local workstation. Moreover, this web of blocks can only be determined by parsing the associations defined inside each blocks.

Because of the intricacy of such web of blocks of information, the task of parsing the associations or elements can be time consuming and tedious. To address this issue, there currently exist two methods for accessing the needed elements.

The first conventional method is to transfer all the elements stored at the IMS mainframe to the local workstation. When the transfer is complete, the related elements are traversed at the local workstation to retrieve desired data for IMS application program execution. Because of potentially large amounts of data, transferring all the elements when only a small subset of which may actually be needed is very computationally inefficient and time consuming.

The second conventional method is to transfer the first element from the IMS mainframe to the local workstation, the content of which is then parsed to determine the element to which the first element relates. This element is then fetched from the IMS mainframe to the local workstation. This process is then repeated until all the related elements have been fetched.

According to the latter method, the potentially large number of "round trips" needed to individually fetch each related element and the time to complete all the individual fetches, is time consuming.

Thus, there remains an unsatisfied need for a system and associated method and computer program product for accessing related data at an IMS mainframe, and for transferring them to a local workstation for further processing. Preferably, the system and method should eliminate the need for accessing and reconstructing related data on two separate computing systems, thereby achieving increased efficiency and reduced processing time.

SUMMARY OF THE INVENTION

The present invention addresses this needs and provides a system, method, and associated computer program product (also collectively referred to as "the present system") for accessing related data on an information management system (IMS) mainframe, and for moving the accessed data to a local workstation for processing.

To this end, the present system provides a utility or program that runs on the IMS mainframe where the related data are stored, and to communicate with the applications or tools that run on the local workstation.

The utility receives a command from the user of the local workstation, containing the identity of the first element to be retrieved. The utility fetches and parses this first element on the IMS mainframe, and identifies its related elements. For each of these related elements, the utility recursively fetches and parses all the other related elements in the web of blocks as defined by the DBD, in a depth-first manner, until all the related elements have been fetched. The fetching and parsing processes take place at the local level on the IMS mainframe, and are thus implemented in a relatively short period of time, since only the related elements are fetched or parsed, to the exclusion of non-related elements.

While fetching and parsing each element, the utility builds an object model of the elements that encapsulates their attributes and properties, as well as their associations, as required by the application at the local workstation;

Upon completion of fetching and parsing processes, the object model is transformed into a single descriptive stream, such as an internet-enabled XML data stream that encodes all the object instances, associations, and attributes of the object model on the IMS mainframe. This XML data stream is transmitted to the local workstation, whereupon it is transformed back into an identical copy of the original object model on the IMS mainframe. The XML encoded object model from the IMS mainframe is preferably sent to the local workstation in a single transmission, and does not contain unnecessary elements.

The use of the object model approach according to the present invention allows a much more efficient processing of user commands by the IMS utility, thereby significantly reducing the processing time and the database management cost.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

DETAILED DESCRIPTION OF PREFERRED EMBODIMENTS

The following definitions and explanations provide background information pertaining to the technical field of the present invention, and are intended to facilitate the understanding of the present invention without limiting its scope:

Database: A logically organized set of data that conforms to some particular schema.

Database systems, also referred to as Database Management System (DBMS): Software used to manage databases. Generally provides services by which applications can access and manipulate the data in the databases under its control, and other services for the administration, security, and integrity of the databases.

Data Stream: A flow of data from one place to another.

Internet: A collection of interconnected public and private computer networks that are linked together with routers by a set of standard protocols to form a global, distributed network.

Markup language: A method of adding information to the text indicating the logical components of a document, or instructions for layout of the text on the page or other information which can be interpreted by some automatic system.

Metadata: data about data. Metadata is definitional data that provides documentation of or information about other data managed within an environment or by an application. Metadata may document data about data elements or attributes such as name, size, or data type. It may also log data about data structures including length, fields, and columns. Other data included in Metadata encompass the association, storage location, and ownership of data. Metadata may additionally include descriptive information about the context, quality and condition, and/or characteristics of data.

XML: eXtensible Markup Language. A standard, semi-structured language used for Web documents. During a document authoring stage, XML "tags" are embedded within the informational content of the document. These tags are not predefined and can be interpreted by different applications for different purposes, such as exchange of data, visual display. For example, when the web document (or "XML document") is subsequently transmitted by a web server to a web browser, the tags are interpreted by the browser and used to parse and display the document. In addition to specifying how the web browser is to display the document, XML tags can be used to create hyperlinks to other web documents.

Figure 1:
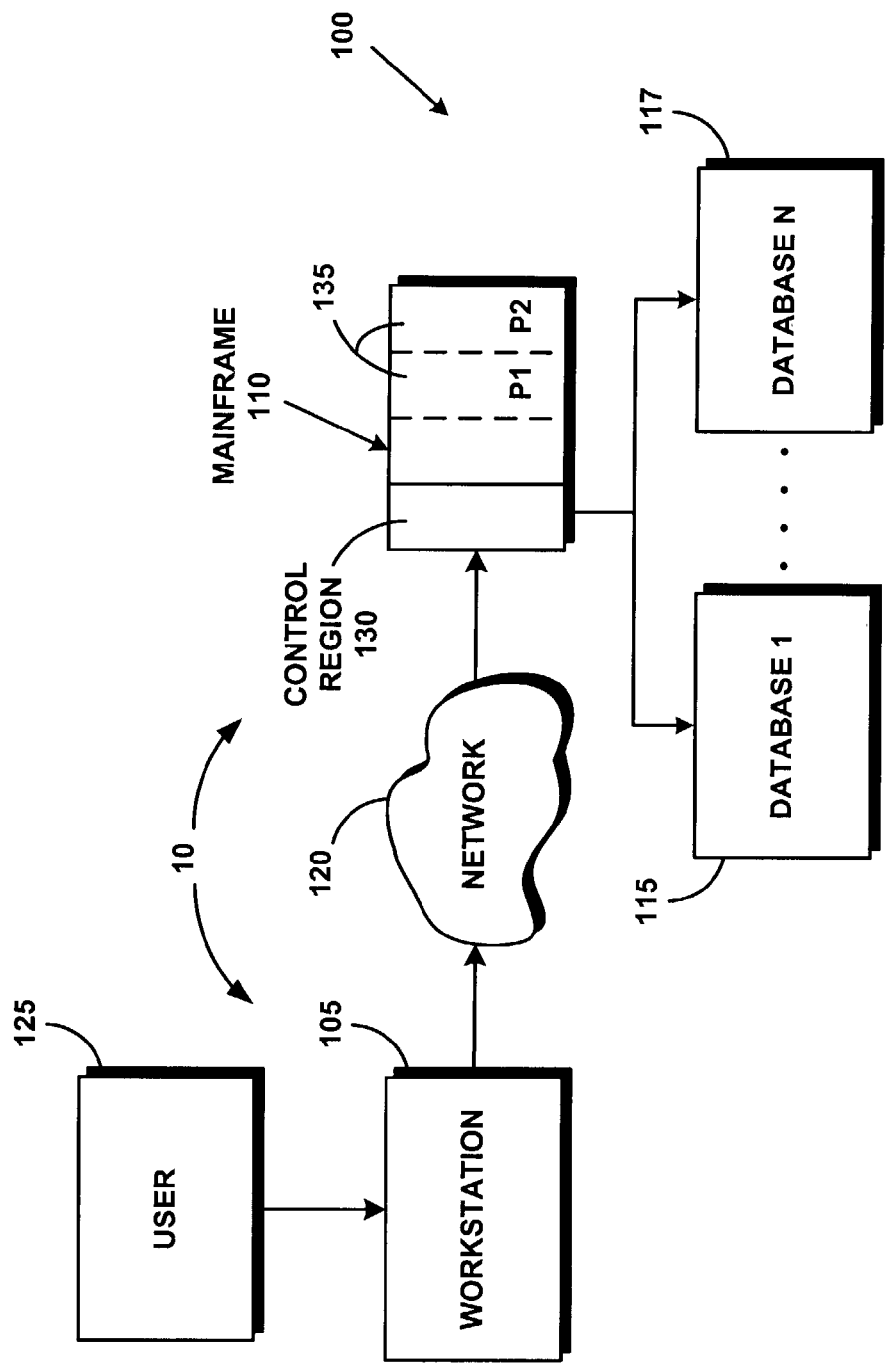
FIG. 1 is a high level architecture of an IMS database system that utilizes the system, method, and computer program product of the present invention, for collecting and processing related data.

FIG. 1 is a high level architecture of an information management system (IMS) 100 that utilizes a system or computer program product 10 of the present invention (also shown in FIG. 3), for collecting and transferring related data from a mainframe 110 to one or more local workstations that are collectively referenced by the numeral 105, according to a preferred embodiment of the present invention.

System 10 includes a software programming code or computer program product that may be embodied on any of a variety of known memories or media for use with a data processing system, such as a diskette, hard drive, or CD-ROM. The code may be distributed on such media, or may be distributed to users from the memory or storage of one computer system over a network of some type to other computer systems for use by users of such other systems. The techniques and methods for embodying software programming code in memory, on physical media, and/or distributing software code via networks are well known and will not be further discussed herein.

The IMS 100 generally comprises the remote central processing mainframe 110 which is capable of providing remote computing as a host server, a plurality of IMS databases 115, 117, and a communication network 120. The local workstation 105 provides an interface to a user 125 by means of any suitable human interface, such as a keyboard, a pointing device, a video display terminal, and so forth. Typically, the local workstation 105 is a computer device capable of data manipulation, storage, and networking. The local workstation 105 also includes an operating system that controls various computing functions and a limited collection of software applications for specialized computing purposes that not provided by the operating system.

The local workstation 105 and the remote central processing mainframe 110 interchange information through the Internet or World Wide Web (WWW) via communication network 120. It should be understood that the communication network 120 is not limited to the Internet, and it can be any available or known network.

The remote central processing mainframe 110 is a high-performance computing device capable of high rate of data processing. In a preferred embodiment, system 10 is deployed totally on the remote central processing mainframe 110 to enable the mainframe 110 to act as an information server. This remote server capability of the remote central processing mainframe 110 allows the user's instructions to be transmitted over the communication network 120.

According to another embodiment, system 10 is deployed in part on the mainframe 110 and in part on the workstation 105.

The remote central processing mainframe 110 comprises a control region 130, and a plurality of IMS application programs 135, such as P1 and P2s. The control region 130 maintains and manages the IMS application programs 135.

In operation, the remote central processing mainframe 110 receives an instruction from the user 125 of the local workstation 105 to execute a specific IMS application program 135. The instruction is dispatched to the control region 130 for further processing. In turn, the control region 130 identifies the information needed for executing the IMS application program 135.

The IMS control region 130 accesses the IMS databases 115, 117 to retrieve relevant data for executing the IMS application program 135. Each of the IMS databases 115, 117 is a dedicated data warehouse computing device wherein large volumes of information are stored on hard disk devices in a hierarchical manner.

Figure 2:
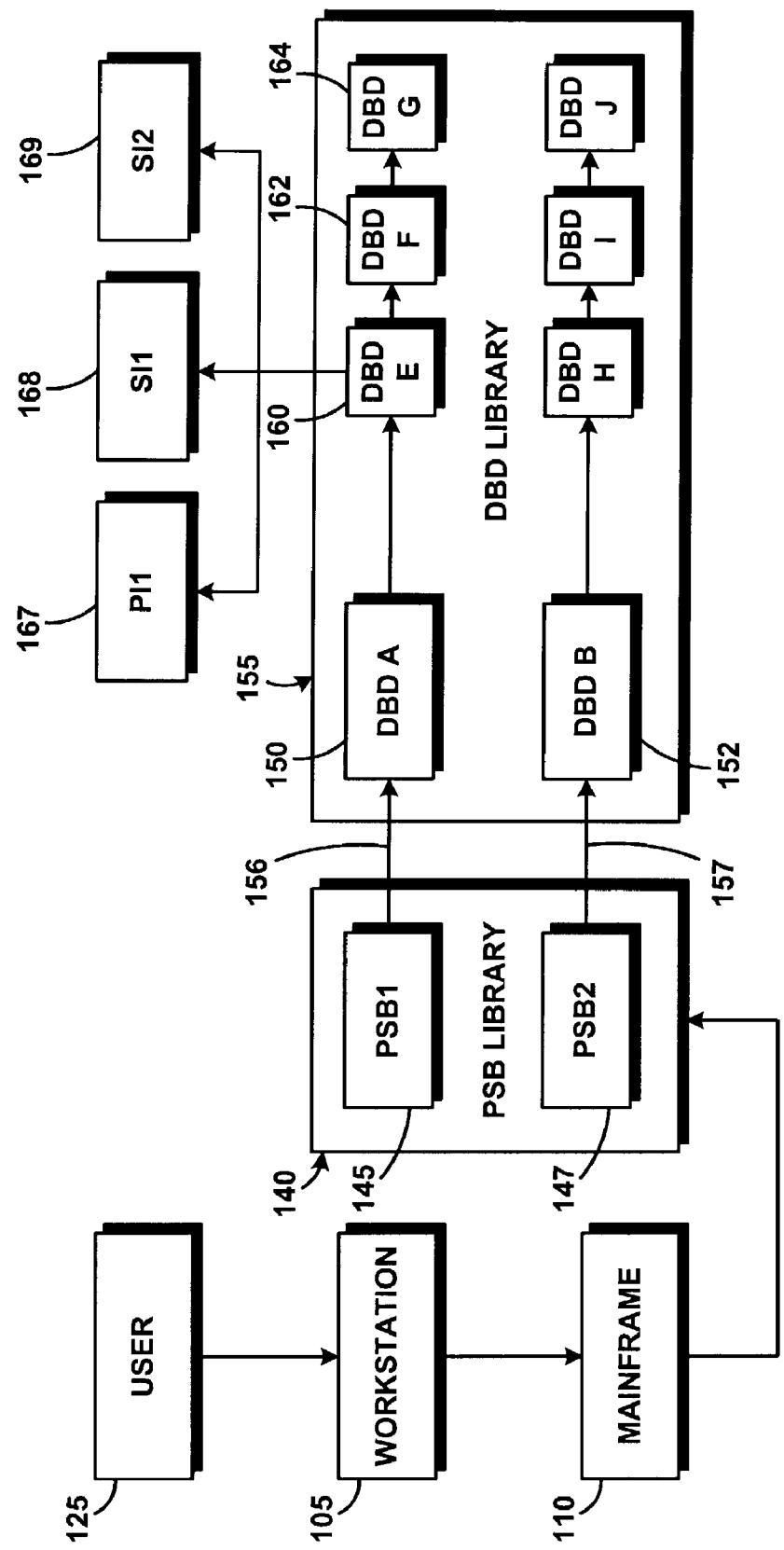
FIG. 2 illustrates a functional block diagram of the remote central processing mainframe and the databases of the IMS database system of FIG. 1.

With reference to FIG. 2, upon receiving an instruction from the user 125, the mainframe 110 transfers this instruction to the control region 130 for executing the application program 135. The control region 130 services this user request by connecting to a program specification block (PSB) library 140, which is stored on a hard disk device on the mainframe 110.

The PSB library 140 is comprised of a plurality of specialized codes referred to as program specification blocks (PSB) 145, 147 such as PSB1 and PSB2. Each of these program specification blocks 145, 147 is responsible for defining the data view of the specified IMS application program.

The PSB 145 (PSB1) and the PSB 147 (PSB2) representing the specified application program 135 are connected to a plurality of logical database descriptions (DBD's) 150, 152, such as "DBD A" and "DBD B", via pointers 156, 157, respectively. Each of these logical DBD's 150, 152 is responsible for defining hierarchical data structures across the plurality of physical databases 115, 117. The logical DBD's 150, 152 are stored in a special library, referred to as DBD library 155, that can reside on the remote central processing mainframe 110. Through this DBD library 155, logical relationships are encoded in the logical DBD's 150, 152.

Each of the logical DBD's 150, 152 further points to a plurality of dependent physical DBD's 160, 162, 164. For example, logical DBD 150 points to physical "DBD E," "DBD F," and "DBD G". Each of the physical DBD's 160, 162, 164 contains encoded hierarchical structures of data stored in one of the IMS databases 115.

The physical DBD's 160, 162, 164 are also stored in the DBD library 157, that resides on the remote central processing mainframe 110. Each physical DBD, such as "DBD E" 160, is referred to as a main database, and may have one or more index databases 167, 168, 169 that point to it. The index databases 167, 168, 169 are referred to as primary or secondary indexes PI1, SI1, SI2, respectively.

Figure 3:
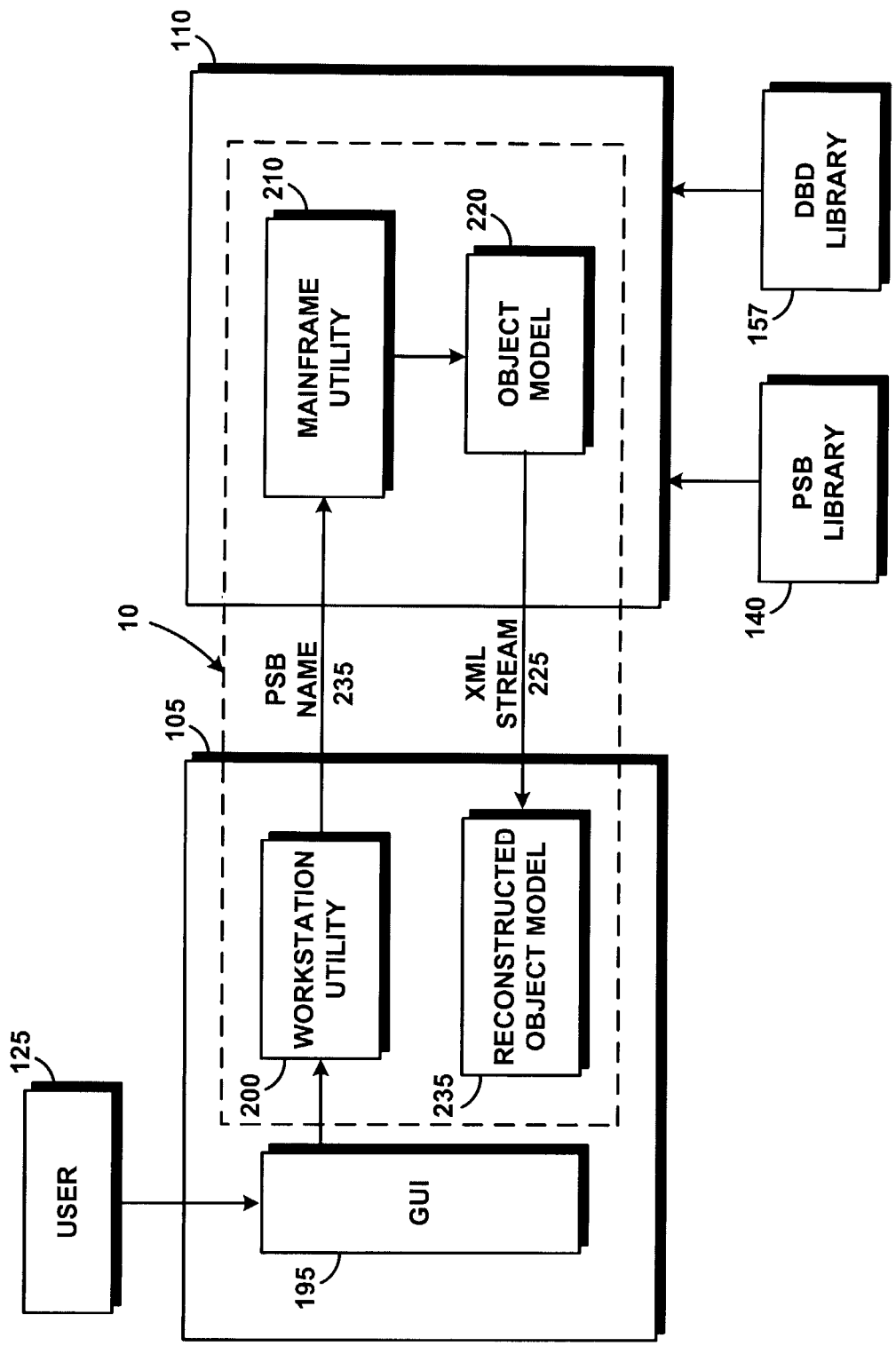
FIG. 3 is a functional block diagram of a preferred embodiment of a system of the present invention, for collecting sets of related data at a mainframe and transferring the collected data to a workstation for processing.

FIG. 3 is a functional block diagram of a preferred embodiment of system 10 of the present invention, for collecting sets of related data at the mainframe 110 and transferring the collected data to the local workstation 105 for further processing. In this illustration, a utility 200 is deployed on the local workstation 105.

The workstation 105 includes a graphical user interface (GUI) 195 with a variety of GUI tools such as menus, dialogs, etc., that enable the user 125 to interact with the local workstation 105 for initiating a request for an IMS action and for performing subsequent processing of the reconstructed object model, 235. This request can further be edited and translated into a specified PSB name 235 using the workstation utility 200.

Upon processing this request, the workstation utility 200 sends the PSB name 235 to a mainframe utility 210 on the remote central processing mainframe 110 via the communication network 120 (FIG. 1). The mainframe utility 210 reads the data from the PSB Library 140, the DBD library 155, and the DBD library 157, and performs a fetching and parsing process 300 (FIG. 4) to complete the retrieval of all related elements of the data in a hierarchical data tree structure.

Figure 4:
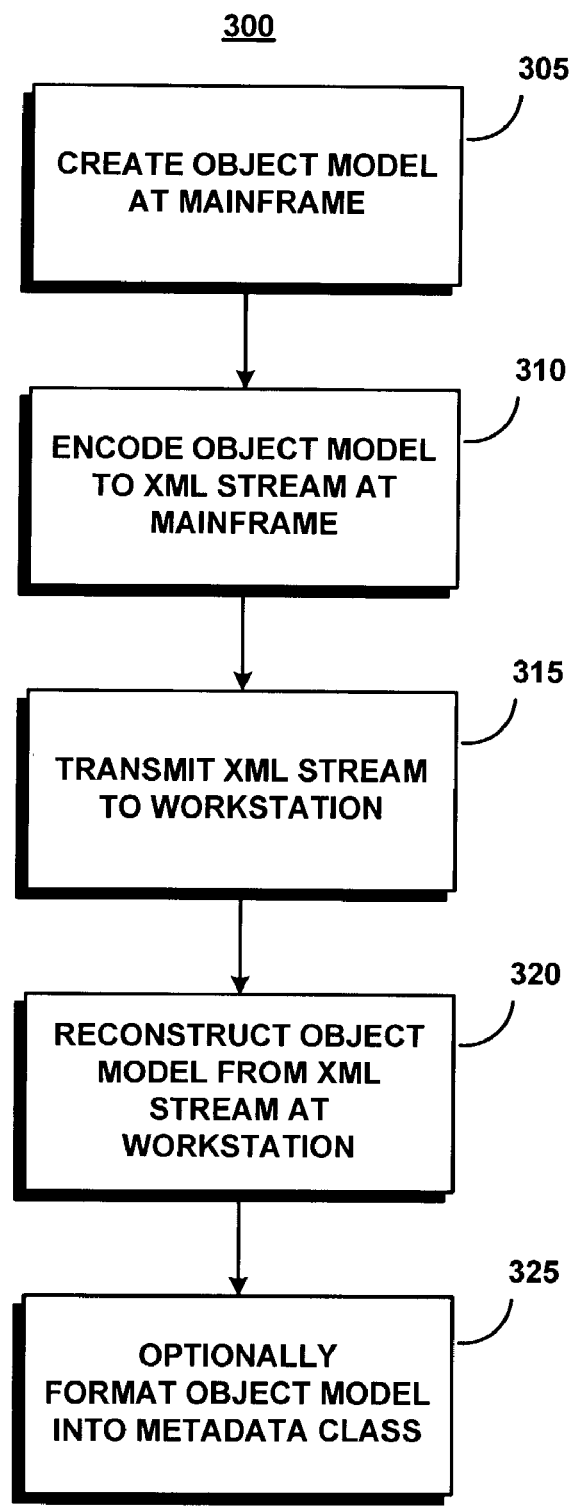
FIG. 4 is a process flow chart illustrating a method used by the system of FIG. 3, for creating an object model according to a preferred embodiment of the present invention.

With further reference to FIG. 4, it illustrates a fetching and parsing process 300 implemented by the mainframe utility 215 of system 10, to create, at step 305, an object model 220 at the remote mainframe 110. The object model 220 contains the retrieved related elements and their associated attributes.

At step 310, the mainframe utility 215 encodes (or transforms) the object model 220 into a single descriptive stream, such as an XML stream 225, and transmits the same to the workstation 105 at step 315. The XML stream 225 encodes all the object instances, associations, and attributes of object model 220.

At step 320, the workstation utility 200 of system 10 decodes the XML stream 225 into a reconstructed object model 235 that is substantially similar or identical to object model 220. At step 325, the local workstation 105 (or the workstation utility 200) formats the reconstructed object model 235 into, for example a metadata class. It should be noted that this is one example of the use of the elements in the reconstructed object model. Once a related set of elements has been reconstituted to an object model on the workstation, these elements could be used for other purpose. Thus, the use of the term "metadata class" refers to a very specific, exemplary, and non-exclusive application.

The object model 220 provides the related elements to the local workstation 105 for further processing. The workstation 105 can include various software applications that process the object model as desired by the user. In the present illustration of the invention, the workstation 105 formats the object model 220 into a metadata class. The object model contains only the related elements of interest. When the reconstructed object model 235 is formatted into the metadata class, all unneeded data elements are eliminated and only the relevant related elements are retained.

According to the present invention, the computing-intensive phases of the fetching and parsing process 300 are implemented on the remote mainframe 110. Due to the high-performance nature of the remote mainframe 110, which is powered by potentially multiple high-speed central processing units (CPU's), the fetching and parsing processes 300 and 400 are relatively fast and highly efficient, as compared to conventional methods.

Moreover, because the object model 220 and the reconstructed object model 235 contain information that is needed by the workstation 105, superfluous data are not transmitted to the local workstation 105 from the remote mainframe 110. Such efficiency affords a much faster processing time than the conventional methods.

It should be understood that the features, and procedures of the elements described herein can be modified within the scope of the invention and are not intended to be the exclusive. Other modifications can be made when implementing the invention for a particular environment.

What is claimed is:

1. A processor-implemented method for collecting and transferring related data in a database management environment, comprising:
    an application on a lower-speed computing processor receiving an input request for data;
    the application transferring the input request to a higher-speed computing processor for execution;
    the higher-speed computing processor remotely performing the following steps in response to the transferred input request:
        collecting and parsing the related data;
        constructing an object model of the related data that encapsulates attributes, properties, and associations of the related data, as required by the application at the lower-speed computing processor, as the related data are being concurrently collected and parsed;
        encoding the object model into a single descriptive stream; and
        transmitting the single descriptive stream to the lower-speed computing processor; and
    the lower-speed computing processor reconstructing the object model from the single descriptive stream.

2. The processor-implemented method of claim 1, further comprising the lower-speed processor converting the object model into a metadata class.

3. The processor-implemented method of claim 1, wherein encoding the object model into a single descriptive stream comprises encoding the object model as an XML data stream.

4. A computer program product having instruction codes stored on a computer useable medium, for collecting related data, comprising:
    an application on a lower-speed computing processor receiving an input request for data;
    a program code for transferring the input request to a higher-speed computing processor for execution;
    the higher-speed computing processor including a program code for remotely performing the following steps in response to the transferred input request:
        collecting and parsing the related data;
        constructing an object model of the related data that encapsulates attributes, properties, and associations of the related data, as required by the application at the lower-speed computing processor, as the related data are being concurrently collected and parsed;
        encoding the object model into a single descriptive stream to the lower-speed computing processor; and
        transmitting the single descriptive stream to the lower-speed computing processor; and
    the lower-speed computing processor reconstructing the object model from the single descriptive stream.

5. The computer program product of claim 4, wherein the lower-speed computing processor converts the object model into a metadata class.

6. The computer program product of claim 4, wherein the higher-speed computing processor encodes the object model as an XML data stream.

7. A processor-implemented system for collecting and transferring related data in a database management environment, comprising:
    an application on a lower-speed computing processor receiving an input request for data;
    means for transferring the input request to a higher-speed computing processor for execution;
    the higher-speed computing processor including means for remotely performing the following steps in response to the transferred input request:
        collecting and parsing the related data;
        constructing an object model of the related data that encapsulates attributes, properties, and associations of the related data, as required by the application at the lower-speed computing processor, as the related data are being concurrently collected and parsed;
        encoding the object model into a single descriptive stream to the lower-speed computing processor; and
        transmitting the single descriptive stream to the lower-speed computing processor; and
    the lower-speed computing processor reconstructing the object model from the single descriptive stream.

8. The processor-implemented system of claim 7, wherein the lower-speed processor converts the object model into a metadata class.

9. The processor-implemented system of claim 7, wherein the higher-speed processor encodes the object model as an XML data stream.

* * * * *